United States Patent [19]

Beno et al.

[11] Patent Number: 4,898,515

[45] Date of Patent: Feb. 6, 1990

[54] EXTERNAL WRAP OF COMPOSITE FLEXBEAM

[75] Inventors: Edward A. Beno, Stratford; William L. Noehren, Trumbull, both of Conn.

[73] Assignee: United Technologies Corporation, Hartford, Conn.

[21] Appl. No.: 888,611

[22] Filed: Jul. 23, 1986

[51] Int. Cl.$^4$ ............................................. B64C 27/38
[52] U.S. Cl. .................................. 416/134 A; 416/230
[58] Field of Search .......... 416/134 A, 138 A, 141 R, 416/230 A, 134 R, 230 R

[56] References Cited

U.S. PATENT DOCUMENTS

| | | | |
|---|---|---|---|
| 3,669,566 | 6/1972 | Bourquardez et al. | 416/138 A X |
| 3,880,551 | 4/1975 | Kisovec | 416/134 A |
| 4,008,980 | 2/1977 | Noehren et al. | 416/134 A |
| 4,037,988 | 7/1977 | Laird | 416/141 |
| 4,047,839 | 9/1977 | Ferris et al. | 416/134 A |
| 4,093,400 | 6/1978 | Rybicki | 416/134 A X |
| 4,299,538 | 11/1981 | Ferris et al. | 416/134 A |
| 4,323,332 | 4/1982 | Fradenburgh | 416/134 A |
| 4,332,525 | 6/1982 | Cheney | 416/134 A |
| 4,352,631 | 10/1982 | Buchs et al. | 416/134 A |
| 4,381,902 | 5/1983 | Head et al. | 416/134 A |
| 4,427,340 | 1/1984 | Metzger et al. | 416/141 |
| 4,455,123 | 6/1984 | Sanders et al. | 416/134 A |

FOREIGN PATENT DOCUMENTS 85129 8/1983 European Pat. Off. ............ 416/134

OTHER PUBLICATIONS

"On the Increasing Fracture Toughness at Increasing Notch Length of 0/90 and ±45/0 Graphite/Epoxy Laminates", P. W. M. Peters, Composites, vol. 14, No. 4, Oct. 1983, pp. 365–369.
"A Study on GRP Skin/Foam Core Sandwich Structures", S. K. Malhotra & B. J. C. Babu, Composites, vol. 14, No. 4, Oct. 1983, pp. 383–386.
"Hughes Flies HARP Rotor, Proposes AH-64B Upgrade", Rotor & Wing International/Aug. 1985, p. 62.
"Design Considerations for Bearingless Rotor Hubs", W. G. Bousman, R. A. Ormiston, & P. H. Mirick, Present, at 39th Annual Forum/American Helicopter Society, May 1983.
"Company Evaluates Bearingless Helicopter Main Rotor System", Aviation Week & Space Technology, Aug. 23, 1982, p. 63.
"What Can Bell's 680 Rotor Offer the LHX Pilot?", D. Green, Rotor & Wing International/May 1986, pp. 48–50 & 53.
Advertisement for Bell 680 Rotor, Aviation Week 8/12/85 (page unknown).
"Gust Response of Hingeless Rotors", G. S. Bir & I. Chopra, Journal of the American Helicopter Society, vol. 31, No. 2, Apr. 1986, pp. 33–46.

Primary Examiner—Donald P. Walsh

[57] ABSTRACT

An external composite wrap (34) of composite fibers (36) is added to the flap flexure portion (14) of a flexbeam (10), which is composed of predominantly unidirectional fibers (32) extending along the length of the flexbeam in (vertically) stacked layers (31). The fibers of the external wrap are disposed at an angle to the unidirectional ply fibers. The external wrap serves to reduce the interlaminar shear stresses in the unidirectional plies and increase the torsional stiffness of the flap flexure portion without significantly increasing the flexural stiffness of the flexbeam. The latter is accomplished by tailoring the thickness of the external wrap relative to flexbeam station (longitudinal position) and optimizing the angle of the external wrap fibers.

8 Claims, 5 Drawing Sheets

| WRAP THICKNESS | WRAP MATERIAL | $K_\theta$ | $T_1/\theta$ | $G_{WRAP}$ |
|---|---|---|---|---|
| 0.0 | | 6.44 | 197. | |
| .050 | E-GLASS | 7.84 | 240. | 1.08 |
| .050 | KEVLAR | 8.08 | 247. | 1.61 |
| .050 | GRAPHITE | 8.57 | 262. | 4.2 |
| .100 | E-GLASS | 8.38 | 256. | 1.08 |
| .100 | KEVLAR | 8.56 | 262. | 1.61 |
| .100 | GRAPHITE | 8.85 | 271. | 4.2 |

EXTERNAL WRAP OF COMPOSITE FLEXBEAM

CROSS REFERENCE TO RELATED APPLICATIONS

Cross reference is made to copending, commonly-owned U.S. patent application No. (UTC Docket No. S-3883), filed on even date herewith and entitled "Lobed Composite Flexbeam".

TECHNICAL FIELD

The invention relates to helicopter rotor design and, more particularly, to flexbeams.

BACKGROUND ART

The structural simplicity of a helicopter rotor that allows the centrifugal loads, as well as all flapping, lead-lag, and torsional motions, to be carried by flexible structural elements (flexbeams) rather than by rolling-element or elastomeric bearings is attractive to the rotor designer. The development of composite materials in recent years has provided the necessary conditions for the design of rotors without bearings, but the apparent structural simplicity of a bearingless rotor conceals a number of difficult design problems, including the strain in a flexbeam element caused by combined deformations, aeromechanical stability, blade-pitch control, and redundant structural load paths.

The bearingless-rotor development efforts to date have been successful in demonstrating that the critical design problems with bearingless rotors can be overcome. However, with each of these development efforts, success in solving a particular design problem has usually been achieved at the expense of another design goal. For example, long fatigue life may be achieved but only by compromising the desired hub-moment stiffness goals.

FLEXBEAM DESIGN CONSIDERATIONS

A certain minimum cross section is required for a flexbeam to support blade centrifugal loads. Under normal operating conditions, flapwise blade deformations will require additional material in the flexbeam to distribute the bending strains, and this increases stiffness and causes the equivalent flap hinge to move outboard. The lead-lag (chordwise) flexbeam stiffness will be governed by the need to place the rotor lead-lag frequency at about 0.7/rev. If the flexbeam is too soft in chordwise flexibility, the rotor will be more susceptible to aeromechanical instability; if it is too stiff, the chordwise loads will increase because of dynamic amplification caused by 1/rev resonance. For torsional motions, it is necessary to minimize the torsional stiffness so as not to increase control actuator loads over current designs.

Depending on the details of the flexbeam design, critical loading conditions may be due to low-cycle/high-strain loading, or high-cycle/low-strain loading. In the former case, the flapping and lead-lag loads that occur during startup and shutdown conditions may dictate flexbeam size. As hub-moment stiffness is reduced to meet the technical goal, the ability of the flexbeam to carry the static droop loads is decreased until the droop-load condition becomes critical in sizing the flexbeam.

High-cycle/low-strain loading will occur because of 1/rev oscillatory flap, chordwise, and torsional loads in forward flight. The cyclic torsional moments required to control the rotor in forward flight require twisting of the flexbeam on the order of ±30°, and this is also a critical high-cycle/low-strain loading.

Cross-Sectional Tailoring of a Flexbeam

For a flexbeam of uniform cross section, the peak flapping strain will be at the root end of the flexbeam, and the chordwise and torsion strains will be relatively constant along the length of the flexbeam. By tailoring the cross section of the flexbeam along its length, it is possible to separate the maximum strains into a flapping flexure inboard and a lag-torsion flexure outboard. This has the advantage of simplifying the flexbeam design in that the flap and lag-torsion flexures may be individually sized for separate load criteria and for reducing the hub-moment stiffness. The disadvantages of tailored cross section flexbeams are that they may be difficult to manufacture and there may be structural difficulties where one cross section transitions to another.

One approach that tailors the cross section of the flexbeam is the Bell Helicopter Model 680. The inboard (flapping flexure) section is rectangular in cross section so that it is relatively stiff chordwise and in torsion, but soft in flapping. The outer (lag-torsion flexure) section transitions to a triple-H cross section which is stiff flapwise, but relatively soft in lead-lag and torsion.

Lag-Torsion Flexure Deformation Requirements

The lag-torsion flexure is designed both for lead-lag frequency placement and to minimize the torsion moment caused by blade twist and, hence, control loads. Within the flexbeam, the moment caused by twist depends on the shear rigidity, GK, where G is the material shear modulus and K is the cross-sectional inertia term; on cross section warping and differential bending effects; and on centrifugal stiffening effects that depend on the cross section radius of gyration. The ratio of the shear modulus to the bending modulus for unidirectional composites is significantly lower than for isotropic materials, and this provides the designer with more flexibility. But despite these material advantages, the cross section must be carefully selected to reduce the twisting moment.

Pitch-Control Concepts

A pitch-control or torque structure of some kind is required to twist the blade outboard of the flexbeam to establish the blade collective and cyclic pitch angles. Whether this is a cantilevered pitch horn, a pitch cuff that encloses the flexbeam, or a torque tube that does not enclose the flexbeam, the primary purpose of the torque structure is to transmit a torsional moment to the blade root. Conceptually, the simplest possible torque structure is a pitch horn extending from the blade root to the pitch link which is very stiff in bending. In this case, a control input will twist the flexbeam, but will also cause a flap deflection (pitch/flap coupling). The only way in which a pure torsional moment can be transmitted to the blade root is if the pitch link load is reacted at the root of the torque structure with a shear restraint. Once a shear restraint is used at the torque structure root, a number of additional design options are opened. The torque structure itself no longer has to be stiff in flapping and chord, for it need only transmit the torsion moment.

Materials for Bearingless Hub Designs

The three major composite formulations now used in the helicopter industry are made of fibers of graphite, fiberglass, or aramid fiber such as KEVLAR® in an epoxy matrix. The low density and high allowable strain of KEVLAR make it a very attractive material; however, its very low compressive strength, approximately 20% of its tensile strength, makes it difficult to use in bearingless hub designs. Graphite-epoxy composites have high stiffness-to-weight ratios and good strain allowables, but relatively poor fracture toughness. Fiberglass, on the other hand, shows good strain allowables and good failure modes, but low stiffness-to-weight ratios.

Hub/Flexbeam Attachments

The hub and flexbeam attachment joint is a difficult and important design issue in a number of respects. Blade flapping and chordwise moments are maximum at the hub center and these loads must be transferred from the flexbeam to the hub and rotor shaft. To minimize hub-moment stiffness, it is necessary to have the flexible portion of the flexbeam as close to the center of the hub as possible, and this minimizes the space available for transferring the high bending loads. It is also desirable to keep the hub small in order to minimize weight and hub drag.

For a four-bladed rotor system one design approach is to clamp two stacked flexbeams perpendicular to one another within a central hub. In general, unidirectional fibers extending along the length of each flexbeam connect opposite blade pairs across the hub and hub clamping plates are bolted around the flexbeams; however, the rotor hub moment must be transferred to the hub clamping plates without causing interlaminar shear failures in the flexbeams.

DISCLOSURE OF THE INVENTION

It is an object of this invention to improve the strength of a crossbeam rotor flexbeam without reconfiguring its basic geometry.

According to the invention, an external composite wrap of composite fibers is added to the flap flexure portion of a flexbeam, which is composed of predominantly unidirectional fibers extending along the length of the flexbeam in (vertically) stacked layers (plies). The fibers of the external wrap are disposed at an angle to the unidirectional ply fibers. The external wrap serves to reduce the interlaminar shear stresses in the unidirectional plies and increase the torsional stiffness of the flap flexure portion without significantly increasing the flexural stiffness of the flexbeam. The latter is accomplished by tailoring the thickness of the external wrap relative to flexbeam station (longitudinal position) and optimizing the angle of the external wrap fibers.

Other objects, features and advantages of the invention will become more apparent in light of the following description thereof.

BEST MODE FOR CARRYING OUT THE INVENTION

Figures 1, 3:
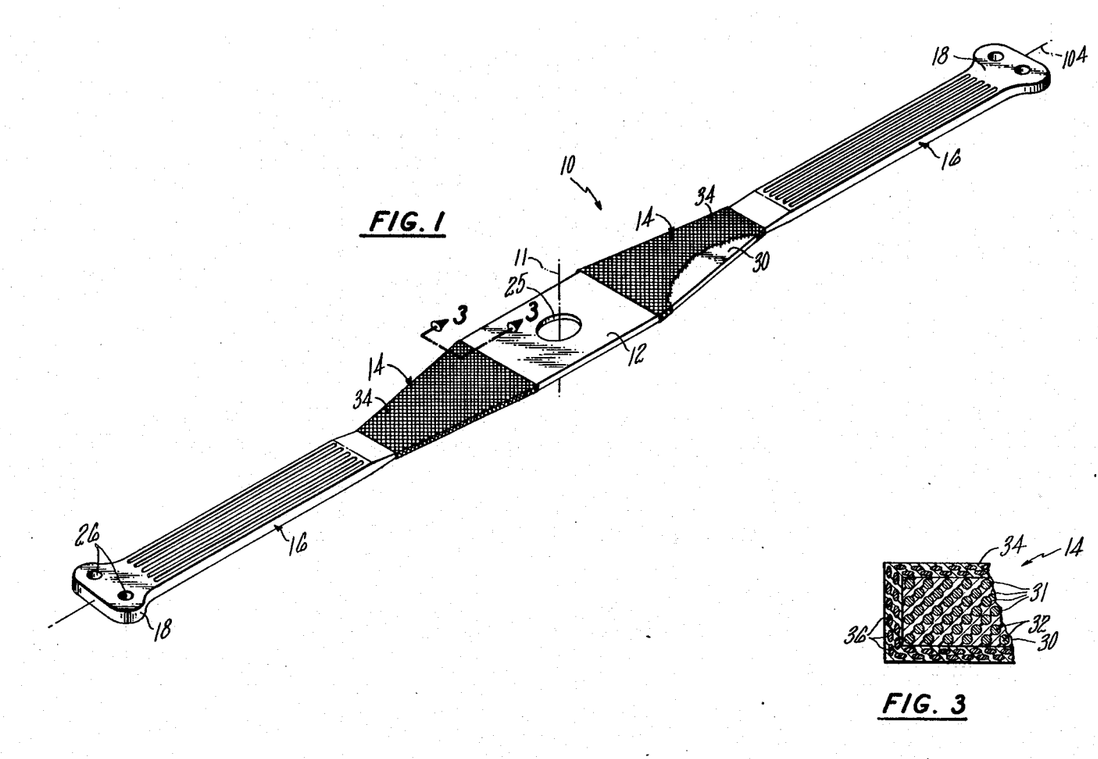
FIG. 1 is a perspective view of the flexbeam of this invention.
FIG. 3 is a cross-sectional view of the flap flexure portion of the flexbeam of FIG. 1, taken along the section 3—3.
Figure 2:
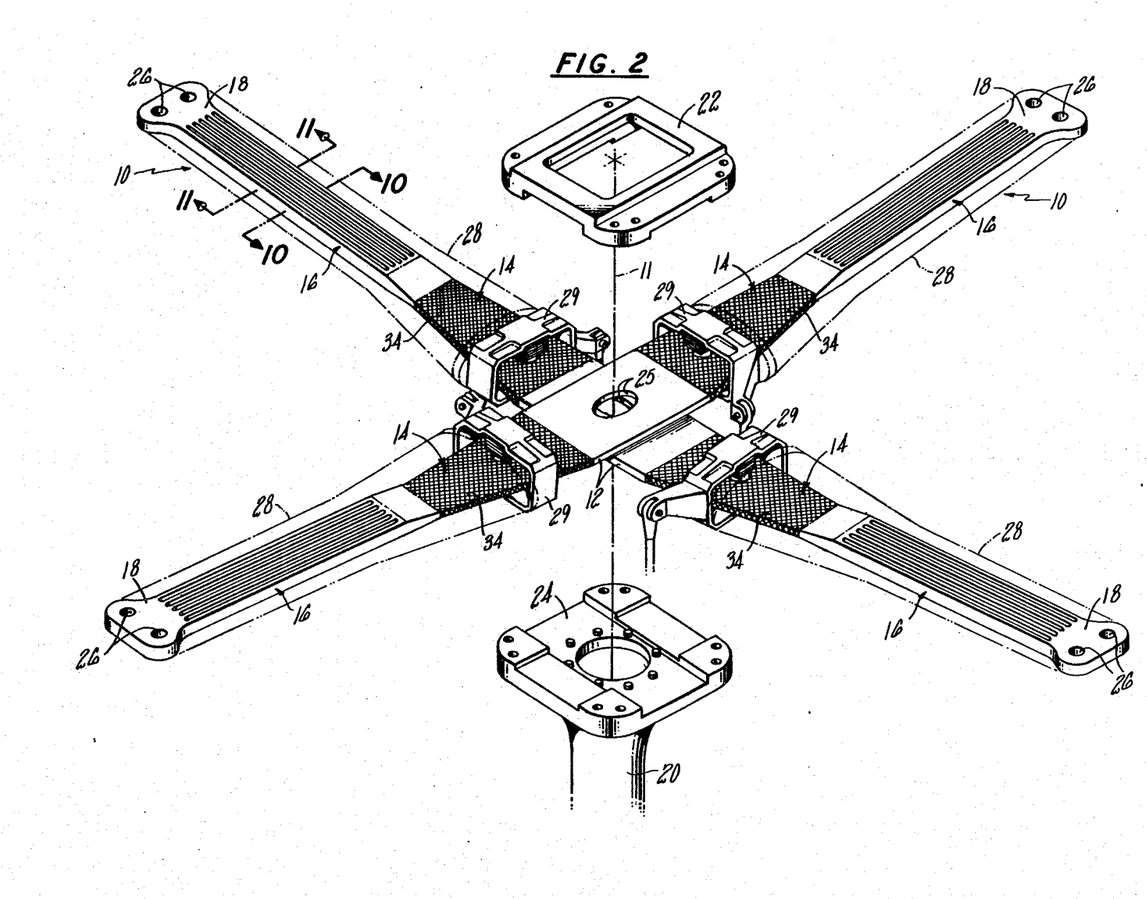
FIG. 2 is a perspective view of two flexbeams according to FIG. 1.

FIG. 1 shows the flexbeam 10 of this invention. The flexbeam is essentially symmetric about the rotorshaft axis 11 and comprises the following major portions; a hub portion 12 attaching to the rotorshaft, an inboard flap flexure portion 14, an outboard lag-torsion flexure portion 16, and a blade-attachment portion 18 at the extreme outboard end of the flexbeam. The entire flexbeam 10 is preferably a unitary composite structure suitable for attaching two blades (not shown) to the rotorshaft and allowing the previously discussed requisite degrees of blade freedom. For a four-bladed rotor system, two such flexbeams would be overlapped at 90°, as shown in FIG. 2, their hub portions 12 overlapping at the axis 11 of the rotorshaft 20 and clamped thereto via an upper hub plate 22 and a lower hub plate 24, as shown. It will be noted that the pair of blades associated with one flexbeam will be slightly out of plane with respect to the pair of blades associated with the other flexbeam with this arrangement, but it has been determined that this condition is entirely acceptable. Else, the hub portions of one or both flexbeams would need to be "stepped" to bring the two pairs of blades into a single plane. This would add unwarranted complexity to the flexbeam design.

The flexbeam is essentially symmetric with respect to the rotorshaft axis. In that the flexbeam is required to react centrifugal blade loads, it is largely made up of composite fibers (or rovings), such as KEVLAR®, E-glass, or graphite which are laid up unidirectionally along the length (longitude) of the flexbeam (i.e., radial to the rotorshaft axis). One specific suitable composite fibre is CELION ST® (available from Celion Corp.), bound in a toughened matrix of 6376 epoxy resin (available from Ciba-Geigy).

The hub portion 12 of the flexbeam is rectangular in cross section (normal to the flexbeam length), made up of several layers (or plies) of the aforementioned composite fibers, said layers defining vertically-stacked planes normal to the rotorshaft axis 11. An elliptical hole 25 is disposed through the hub portion at the rotorshaft axis, the major axis of the ellipse being aligned longitudinally with respect to the flexbeam (as best viewed in FIG. 1). An elliptical hole so aligned will minimize the stress concentration factor across the flexbeam, a concept which is disclosed in greater detail in commonly-owned U.S. Pat. No. 4,008,980 (Noehren, et al., 1977).

The blade-attachment portion 18 of the flexbeam is strengthened with cross plys (layers of fibers at 45° to the flexbeam length in planes normal to the rotorshaft axis) to permit drilling of suitably dimensioned holes 26 to receive the blade root via two bolts (not shown) disposed nearly parallel to the rotorshaft (not quite parallel thereto due to preconing in the flexbeam).

Torque tubes 28 are shown (in phantom) extending from a pitch horn 29 at an inboard location on the flexbeam to the outboard blade attachment portion 18.

Flap Flexure Portion

The flap flexure portion 14 of the flexbeam is rectangular in cross section (normal to the flexbeam length), tapering in width from a greater width at its inboard end where it meets the hub portion 12 to a lesser width at its outboard extreme where it meets the lag-torsion flexure portion 16, and tapering in thickness from a greater thickness at its inboard extreme to a lesser thickness its outboard extreme to match the thicknesses of the hub and lag-torsion flexure portions, respectively. The relative length of the flap flexure portion is approximately 10% of the overall rotor radius (rotorshaft axis to blade tip).

Referring to FIG. 3, which is a cross section of the flap flexure portion 14, the flap flexure portion has a rectangular core 30 made up of several vertically-stacked layers (plies) 31 of the aforementioned composite fibers 32.

Extensive fatigue testing of several main and tail rotor flexbeam designs has shown that the structural performance of the flexbeam is limited by interlaminar cracks that occur between the plies 31 of the composite material. During testing, cracks originate at the edge of the flexbeam and propagate inward causing a loss of stiffness and strength. Although not catastrophic, this failure mode limits the service life of the flexbeam.

A careful study of these interlaminar cracks revealed that they were caused by a combination of loadings and stress concentration that caused localized interlaminar shear stress peaks to occur along the edge of the flexbeam. It was determined that a selectively tailored overwrap could reduce these interlaminar shear stresses in the flap flexure region without compromising any of the other attributes of the flexbeam.

Therefore, as seen in FIGS. 1 and 3, the core 30 of the flap flexure portion 14 is covered by an external wrap 34 made up of composite fibers 36 having an angular orientation with respect to the longitudinal core fibers 32. The orientation of the external wrap fibers 36 is preferably ±45° with respect to the core fibers 32.

The external wrap 34 has a significant effect on reducing each of the following four factors that contribute to interlaminar shear stresses in the layers 31 of the core. As stated, interlaminar shear stresses are the primary factor limiting the life of the flap flexure portion. The four factors are:

1. Imposed pitch (torsion) forces;
2. Ply endings in the core section; and
3. Flatwise shear forces;
4. Twisting moments induced by bending deflections multiplied by shear forces.

The external wrap reduces the shear stress factors (1 and 4) by locally increasing the torsional rigidity due to the shear modulus of the angle plies (external wrap fibers 36).

The second factor, ply endings in the core section, produced by the transfer of axial and bending stresses around ply endings is reduced by the local increase in bending stiffness of the wrap term. The third factor, based on Lekhnityskii's equation for wide anistropic beams, is also reduced by the local increase in flapwise bending and shear stiffness.

The effects of each term (factors 1-4) can be tailored by proper choice of wrap material, thickness, and angle orientation; and is well within the purview of one skilled in the art.

Figure 4:
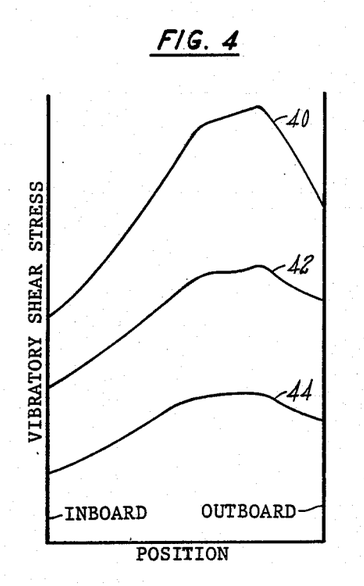
FIG. 4 is a graph showing characteristics of the flap-flexure portion of the flexbeam of this invention.
Figure 5:
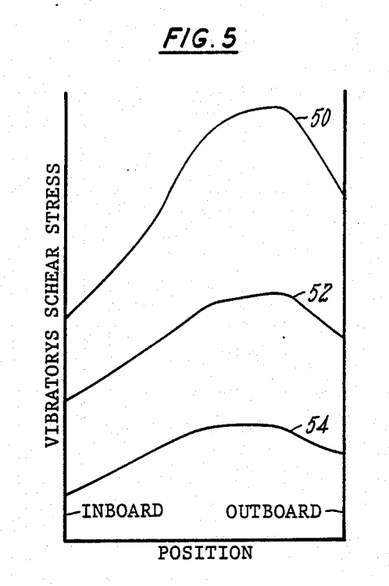
FIG. 5 is a graph showing characteristics of the flap-flexure portion of the flexbeam of this invention.
Figure 6:
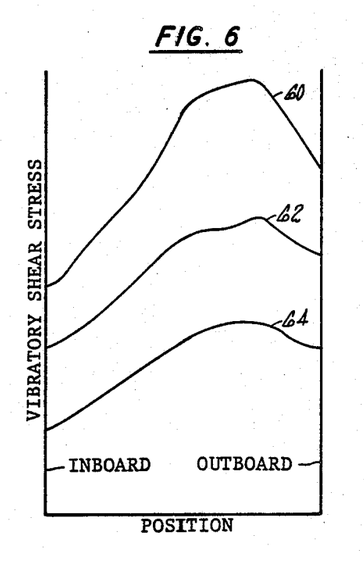
FIG. 6 is a graph showing characteristics of the flap-flexure portion of the flexbeam of this invention.
Figure 7:
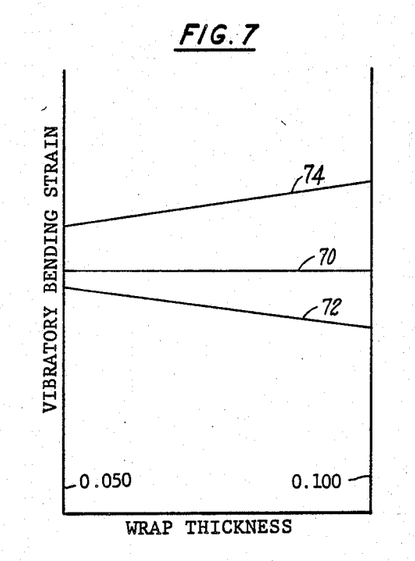
FIG. 7 is a graph showing characteristics of the flap-flexure portion of the flexbeam of this invention.

The graphs of FIGS. 4-6 plot for different composite fibers the expected effect of the external wrap on the shear stresses under maximum flight loads. The graph of FIG. 7 plots bending strain allowables to a ±45° external wrap.

The graph of FIG. 4 is a plot of vibratory shear stress (vertical axis) versus position (horizontal axis) along the flexbeam (in the flap flexure portion only) from "inboard" (towards the rotorshaft) to "outboard" (towards the blade). The curve 40 represents the stress in an unwrapped flap-flexure portion, the curve 42 represents the stress in a flap-flexure portion having a 0.050" thick external wrap of ±45° E-glass (about 5 plies), and the curve 44 represents the stress in a flap-flexure portion having a 0.100" thick external wrap of ±45° E-glass. One will readily appreciate the reduction in vibratory shear stress attributable to the external wrap.

The graph of FIG. 5 is a plot of vibratory shear stress versus flexbeam longitudinal position (station) similar to FIG. 4 for an unwrapped 50, 0.050" wrapped 52, and a 0.100" wrapped 54 flap-flexure portion. In this case, the external wrap is ±45° graphite fibers.

Likewise, the graph of FIG. 6 shows curves for an unwrapped 60, 0.050" wrapped 62, and a 0.100 wrapped 64 flap flexure portion, using ±45° KEVLAR fiber in the external wrap.

If the graphs of FIGS. 4-6 were overlapped, one would notice that the graphite external wrap (FIG. 5) results in the greatest reduction in vibration shear stress in the flap flexure portion, E-glass (FIG. 4) results in a slightly lesser reduction, and Kevlar (FIG. 6) results in the lowest reduction.

The graph of FIG. 7 is a plot of maximum vibratory bending strain in the flap flexure portion (vertical axis) versus wrap thickness (horizontal axis) showing curves 70,72,74 for ±45° external wrap of E-glass, graphite, and KEVLAR, respectively. From this graph it is apparent that graphite fibers are the best choice of composite material for the external wrap of the flap flexure portion, since the strain is both less than and decreases more dramatically than that of KEVLAR or E-glass. (Actually, the strain in the KEVLAR was found to increase with thickness.)

Figure 8:
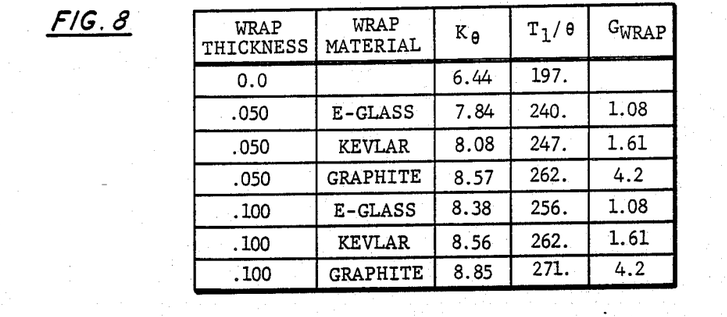
FIG. 8 is a table showing characteristics of the flap-flexure portion of the flexbeam of this invention.

The table of FIG. 8 presents a tabulation of $K_\theta$ (torsional stiffness), $T_1/\theta$ (maximum shear stress at the midpoint of the flap flexure edge), and $G_{wrap}$ (shear modulus of the wrap itself) for an unwrapped flap flexure, and flap flexures externally wrapped with ±45° E-glass, KEVLAR, and graphite of 0.050" and 0.100" thickness, respectively. The table indicates that the torsional stiffness of the flap flexure portion increases when the external wrap is applied thereto; graphite exhibiting the greatest increase in torsional stiffness over an unwrapped flap flexure.

An advantage of the external wrap is that the service life of flexbeams in use can be extended by the addition of the external wrap. This implies that new tooling would not be required for fabrication of the "basic" (unwrapped) flexbeam.

The external wrap can be filament wound, or applied by hand. The external wrap can be an add-on to existing flexbeams, or can be integral with a new design flexbeam.

The external wrap extends the life of (otherwise) limited-life flexbeams, and allows local changes to flexbeam properties without significantly affecting overall flexbeam features. The invention is applicable to main or tail rotors and should result in a 30-35% increase in fatigue strength over current technology flexbeam designs.

Dynamic modeling of the flap flexure portion of the flexbeam of this invention has exhibited fatigue endurance of seven degrees of flapping freedom. According to published data, Bell Helicopter's Model 680 flexbeam exhibits only 3-4 degrees of flap per se, additional flapping freedom being contributed by a long flexible rotorshaft. A long rotorshaft is undesirable.

It is known to provide a blade with built-in negative twist for enhanced hover performance. Therefore, the flexbeam 10 may be provided with a built-in positive twist so that there is no net twist at the hub. This may be accomplished either by twisting the flap flexure portion 14 out-of-plane with respect to the hub portion 12 at the junction thereof (e.g., ten degrees), or by twisting the blade attachment portion 18 out-of-plane with respect to the lag-torsion flexure portion 16 at the junction thereof (e.g., four degrees), or a combination of both. Of course, twisting the flap flexure portion out-of-plane would soften its edgewise stiffness (lower $W_E$). The preferable edgewise stiffness for the flap flexure portion is 0.70 per rev. $W_E$. The built-in twist of the flexbeam is not evident in FIGS. 1 and 2.

Figure 9:
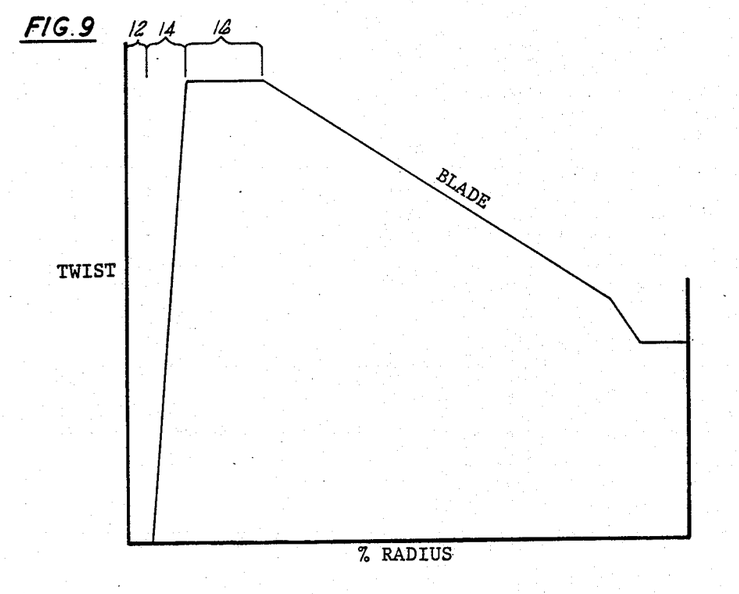
FIG. 9 is a graph of twist angle (out of a plane normal to the rotorshaft axis) versus position (expressed in % rotor radius) for the flexbeam of this invention and a typical blade.

To enhance hover performance it is also desirable that the outboard end of the torque tube (28) be at the same aerodynamic angle of attack as the blade root, and to minimize profile drag it is desirable that the inboard end of the torque tube be feathered. Also, it has been found that a positive twist in the flap flexure portion of the flexbeam improves aeroelastic stability through favorable flap/lag couplings. The optimum combination of flexbeam and torque tube twist which produces good aerodynamic performance and enhanced stability is shown in FIG. 9. Note that the flexbeams are not twisted in their hub portion (12) because to do so would increase the separation between the upper and lower flexbeams where they pass in close proximity to each other.

Figure 10:
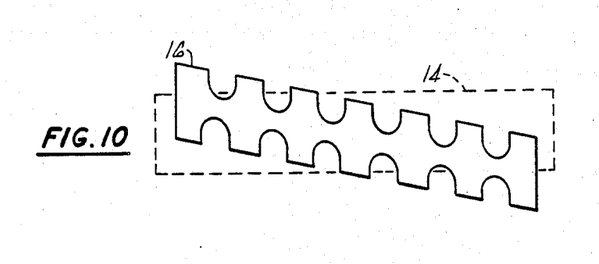
FIG. 10 is a cross-sectional outline of the lag-torsion portion of the flexbeam of this invention taken along 10—10 of FIG. 2.

FIG. 10 shows the lag-torsion flexure portion 16 pretwisted with respect to the flap flexure portion 14.

It is also desirable to provide a measure of preconing in the flexbeam to reduce flexbeam flapwise strains caused by rotor thrust. Thus, the flap flexure portion 14 is tilted upwards out-of-plane with respect to the hub portion 12 at the junction thereof. The desired amount of preconing is a function of helicopter gross weight.

Lag-Torsion Flexure Portion

When torsional forces (pitch control inputs and/or aerodynamic forces) are applied to the blade root end (i.e., the blade-attachment portion 18 of the flexbeam), it is intended that the lag-torsion flexure portion 16 of the flexbeam twist in response thereto, and that the flap flexure portion 14 does not. It is also desirable that the lag-torsion flexure portion be somewhat flexible in-plane (low $W_E$) so that blade lead/lag activity is accommodated in this portion of the flexbeam. Lastly, it is of utmost importance that the lag-torsion flexure portion of the flexbeam be extremely stiff in the flapwise (vertical) direction (high $W_F$) so that the effective hinge offset is concentrated in the inboard flap flexure portion of the flexbeam. Effective hinge offset is discussed in detail in commonly-owned U.S. Pat. No. 4,323,332 (Fradenburgh, 1982).

A multiple-lobed H-beam (crossbar of the H's in-plane, uprights of the H's vertically-aligned) fits the bill quite nicely for achieving these design objectives. The Bell Helicopter Model 680 triple-H (three grooves, four lobes) lag-torsion flexure portion cross section is noted. Therein, the grooves and lobes H's are essentially square in cross section.

As is readily observable in FIG. 2, the lag-torsion flexure portion 16 of the flexbeam 10 is multiple-lobed, and hence, multiple-grooved. The lobed lag-torsion flexure portion 16 provides a structural solution for a soft in-plane rotor system while still maintaining the dynamic requirements, i.e., simultaneously, a. to provide a high section modulus in the chordwise direction (to achieve acceptable strain levels for coriolis generated edgewise moments);
b. to maintain an acceptable chordwise moment of inertia (to achieve acceptable dynamic response);
c. to minimize torsional stiffness (to achieve acceptable control loads and shear stresses due to feathering);
d. to minimize torsional shear stresses and;
e. to maintain an acceptable twist-bend buckling strength.

Figure 11:
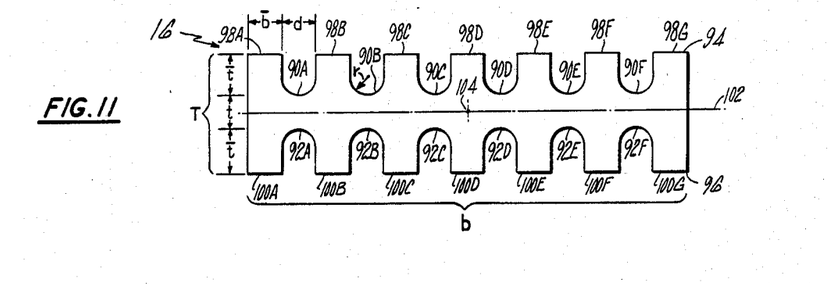
FIG. 11 is a cross-sectional outline of the flexbeam of this invention taken along 11—11 of FIG. 2.

FIG. 11 is a cross-sectional outline of the lag-torsion flexure portion 16 of the flexbeam 10. One can envision six longitudinal slots (grooves) 90A-90F, 92A-92F being machined in both the upper 94 and lower 96 surfaces of an otherwise rectangular (cross section) member, resulting in seven flanges 98A-98G, 100A-100G. The grooves extend from the upper and lower surfaces 94, 96 of the member a depth t' approximately one-third of the overall thickness T through the member to a central planar (in-plane with respect to the flexbeam and midway between its upper and lower surfaces) portion 102 of thickness t, as shown. The grooves are radiused (r) at their bases, which is defined as the portion of the grooves adjacent the central planar portion 102. A centerline 104 for the flexbeam is defined as a middle position on the flexbeam with respect to its width (b).

It is of no little consequence that an even number of grooves (resulting in an odd number of lobes) was chosen for this design, and that the central lobes 98D,100D are disposed on the centerline 104 of the flexbeam. Looking at the effects resulting from torsional forces applied around the centerline to a multiple-lobed beam projecting from a wall, by having a lobe at the centerline more of the cross-sectional material is at the centerline, which in this case is the feathering axis. Hence, the beam is more torsionally soft. (The Bell 680 has an even number of lobes.)

The geometry of the lobed section is determined from the following series of closed form equations which for given flexbeam design requirements can tailor an efficient lag-torsion flexure portion.

A. Torsional Stiffness (J)

$$J = \frac{bt^3}{3} + \frac{2N\bar{b}\bar{t}^3}{3}$$

B. Chordwise Moment of Intertia ($I_C$)

$$I_C = \frac{tb^3}{12} + 4 \sum_{k=1}^{N/2} (\bar{b}\bar{t}) \left[ \left( \frac{2K-1}{2} \right)(d + \bar{b}) \right]^2$$

C. Flatwise Moment of Intertia ($I_F$)

$$I_F = \frac{bT^3}{12} - 2(n-1)\,d\bar{t}\left(\frac{t+\bar{t}}{2}\right)^2$$

D. Applied Strain (E)

$$E = \frac{M_C}{E\frac{I_C}{b/2}} + \frac{M_F}{E\frac{I_F}{T/2}}$$

wherein:
b is the section width;
t is the central thickness (see FIG. 11);
N is the number of lobes;
$\bar{b}$ is the lobe width;
$\bar{t}$ is the groove depth;
d is the distance between lobes;
T is the total thickness of the lobes;
$M_C$ is the chordwise moment; and
$M_F$ is the flatwise moment.

These first four equations A–D were applied to a model of the lag-torsion flexure portion that had squared lobes (as in the Bell 680), since the lobe radii are somewhat irrelevant to these parameters (torsional stiffness, moment of inertia for flatwise/edgewise bending). The equations A–D verify that buckling and axial strains are satisfied for the present design.

Equations E–H are derived from Timoshenko's equations (*Strength of Materials*, 3rd Edition) for filleting (radiusing) in shafts and verify that radiusing the lobes satisfies torsional shear stress (from applied torque) criteria. The radius r (for the cross section shown in FIG. 11) is determined by the following equations E–H.

E. Applied Torque $$\text{Torque} = \frac{GJ\theta}{57.3L}$$

F. Torsional Shear Stress (S)

$$S = \frac{(t\max)G\theta\,K_T}{57.3L}$$

G. Torsional Stress Concentration ($K_T$)

$$K_T = 1.74\sqrt[3]{\frac{t}{r}}$$

H. Twist-Bend Buckling Strength ($M_{CR}$)

$$M_{CR} = \left[ \left( \frac{2P^2 EI_F}{L^2} + T_C \right)(GJ + T_C K^2) \right]^{1/2},$$

$$K^2 = \left( \frac{I_F + I_C}{A} \right)$$

wherein:
G is the shear modulus;
J is the torsional stiffness;
$\theta$ is the twist angle;
L is the length of the lobed section;
P is pi;
$T_C$ is the centrifugal force; and
K is the radius of gyration.

The resulting cross section of the lag-torsion flexure portion satisfies all of the structural and dynamic requirements of a soft in-plane bearingless rotor, and is not gust sensitive. The gust sensitivity of a hingeless rotor is discussed in an article by Bir and Chopra (Journal of the American Helicopter Society, Vol. 31, No. 2, page 33, Apr. 1986).

It should be noted that the large number of lobes and full radius at the bottom of each groove provides increased torsional performance relative to the prior art (Bell 680) which has no groove blend radius (r) and therefore a high torsional stress concentration factor.

Figure 12A:
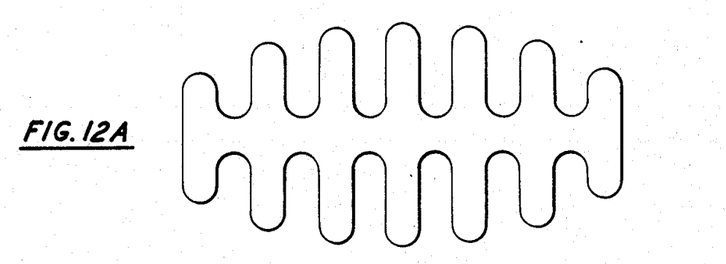
FIG. 12A is a cross-sectional outline of an alternate embodiment of the lag-torsion flexure portion of the flexbeam of this invention.

The applied torque is resolvable into two components; pure torsion and differential bending. The latter has been discussed with respect to the lobes, and it is predictable that the highest shear load will be in the outermost (98A,100A and 98G,100G) lobes. Thus, FIG. 12A represents a cross section for the torsion flexure specifically tailored to equalize shear stresses in the flanges (the height t' of the flanges decreases from the centermost flanges 98D,100D, (the flanges immediately on the longitudinal centerline 104 of the flexbeam) to the edgemost lobes 98A,98G,100A,100G (the lobes at the leading/trailing edges of the flexbeam).

Conceivably, one could tailor the radius (r) of each groove to optimize the torsion flexure characteristics. However, insofar as pure torsion (resulting from applied torque) is concerned, this would have no significant effect. Furthermore, in the case of machined-out grooves, a multiplicity of tools would be required. Nevertheless, if the lobes were formed in a molding process, r could be tailored on a groove-by-groove basis.

Figure 12B:
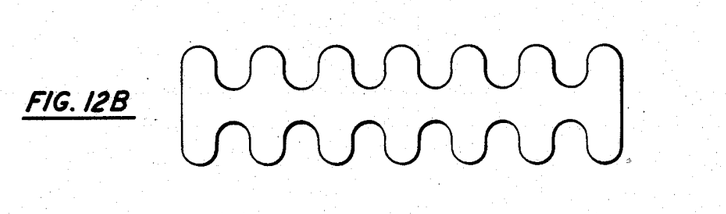
FIG. 12B is a cross-sectional outline of an alternate embodiment of the lag-torsion flexure portion of the flexbeam of this invention.
Figure 12C:
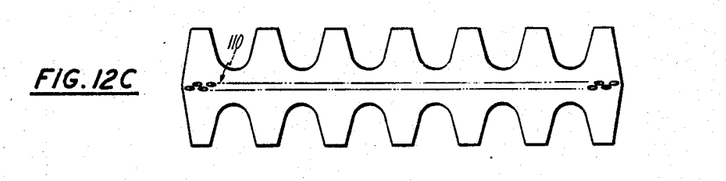
FIG. 12C is a cross-sectional outline of an alternate embodiment of the lag-torsion flexure portion of the flexbeam of this invention.

Molding the lobes, or a combination of molding and machining is projected as the preferred process for achieving the torsion flexure longitudinal cross sections shown in FIGS. 12B and 12C. In FIG. 12B the lobes are radiused at the upper and lower surfaces of the lag-torsion flexure to provide a modified stiffness distribution.

FIG. 12C shows a layer 110 (or layers) of composite material disposed at the midplane of the lag-torsion flexure portion and laid up at an angle, such as ±45° to the longitudinal fibers. (The midplane is the central region of the lag-torsion flexure midway between the upper and lower surfaces thereof and is within the central planar portion 102 - see FIG. 11.) This embodiment would have the advantage of enhanced in-plane shear strength without an increase in torsional stiffness.

Figure 12D:
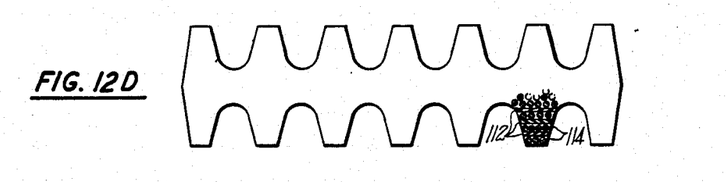
FIG. 12D is a cross-sectional outline of an alternate embodiment of the lag-torsion flexure portion of the flexbeam of this invention.

FIG. 12D shows an embodiment of the lag-torsion flexure portion wherein the flanges incorporate alternating layers of elastomer 112 and composite fibers 114 (32). This embodiment would have the advantage of reduced torsional stiffness and stresses.

Summary

This invention is accomplished while maintaining minimum flexbeam weight and is within the state of the art fiber matrix manufacturing technologies.

1. The flexbeam 10 segregates the flap and lag-torsion flexure regions to improve fatigue performance.
2. The flap flexure portion is wrapped with a ±45° filament winding to reduce interlaminar shear stresses and to force all torsional deflections to occur in the lag-torsion flexure portion. Since the flap flexure portion does not have to twist it can accommodate higher flapping motion.
3. The lag-torsion flexure portion begins outboard of the flap flexure portion (a unique point as defined from the blade mode shape) so as to not increase the rotor hub moment stiffness. High hub moment stiffness causes vibration and large rotor shaft fatigue stresses. An 8% equivalent hub moment offset has been demonstrated with the flexbeam 10.
4. The lobed cross section shape of the lag-torsion flexure portion is optimized to produce the best balance of stiffnesses, torsional stresses, and bending stresses. Seven lobes with a full radius groove appear to be optimum.
5. The flexbeam and torque tube are twisted as in FIGS. 9 and 10 to optimize aerodynamic performance while providing favorable aeroelastic flap/lag couplings without increasing the separation between the upper and lower flexbeams where they pass within close proximity.

We claim:

1. A flexbeam (10) having a hub portion (12), a flap flexure portion (14) outboard of the hub portion, a lag-torsion flexure portion (16) outboard of the flap flexure portion, and a blade attachment portion (18) outboard of the lag-torsion portion, and having core fibers (32) of composite material extending longitudinally along the length of the flexbeam, characterized by:
   an external wrap (34) made up of composite fibers (36) having an angular orientation with respect to the longitudinal flexbeam core fibers (32) and disposed about the flap flexure portion.
2. A flexbeam according to claim 1 characterized in that the external wrap fiber angular orientation is plus/minus forty-five degrees.
3. A flexbeam according to claim 1 characterized in that the external wrap is integral with the flap flexure portion.
4. A flexbeam according to claim 1 characterized in that the external wrap has a thickness of 0.050 to 0.100 inch.
5. A flexbeam according to claim 1 characterized in that the longitudinal flexbeam fibers (32) are disposed in layers (31); and
   the fibers (36) of the external wrap are of a suitable material and thickness so as to reduce interlaminar shear stresses in the layers (31), and increase the torsional stiffness of the flap flexure portion.
6. A flexbeam according to claim 5 characterized in that the fibers (36) of the external wrap are graphite and are laid up in layers totaling approximately 0.050 to 0.100 inch overall thickness.
7. A flexbeam according to claim 5 characterized in that the fiber material for the external wrap is selected from the group consisting essentially of aramid, glass and graphite.
8. A flexbeam according to claim 1 further characterized by the flap flexure portion being twisted out of plane with respect to the hub portion in an amount sufficient to optimize aerodynamic performance.

* * * * *